Figure 1:
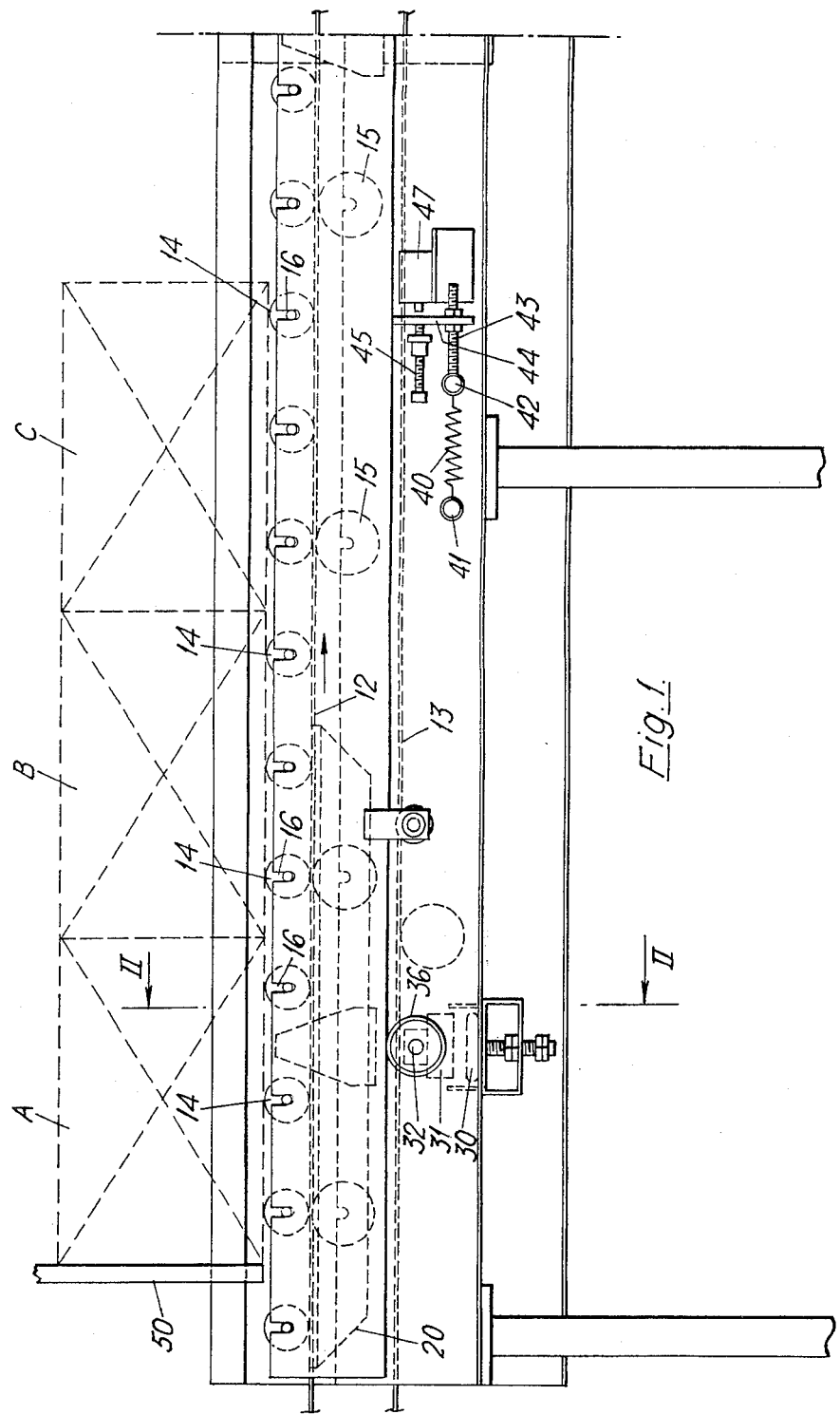

United States Patent [19]
de Courcy

[11] 3,900,097
[45] Aug. 19, 1975

[54] LIVE ROLLER CONVEYOR

[75] Inventor: Rowland J. J. de Courcy, Basingstoke, England

[73] Assignee: Douglas-Rownson Limited, Basingstoke, England

[22] Filed: June 26, 1974

[21] Appl. No.: 483,358

[30] Foreign Application Priority Data
June 29, 1973  United Kingdom............... 31114/73

[52] U.S. Cl............................................ 198/127 R
[51] Int. Cl.............................................. B65g 13/02
[58] Field of Search ............ 198/127 R, 127 E, 203, 198/232

[56] References Cited
UNITED STATES PATENTS
| | | | |
|---|---|---|---|
| 3,502,197 | 3/1970 | Kato................................ | 198/127 R |
| 3,756,376 | 9/1973 | Kürger............................ | 198/127 R |

*Primary Examiner*—Richard A. Schacher
*Attorney, Agent, or Firm*—Brisebois & Kruger

[57] ABSTRACT

A roller conveyor of the kind in which rollers are free to turn between side members and are driven by means of an endless driving belt or the like which engages the undersides of the rollers is so constructed that at least one group of rollers together with the supporting side members form a unit mounted for movement in a generally horizontal plane in a direction opposite to the direction of conveying against a resilient biasing force, movement in this direction in excess of a predetermined amount serving to actuate a control member to operate an independently powered mechanism for separating the rollers of the unit from the driving belt or the like so that the frictional drag is completely removed. The independently powered mechanism is released again when the control member is released and a braking pad is provided to engage a few rollers at the leading end of the unit when the rollers are separated from the driving belt or the like. The independently powered mechanism preferably lifts the unit as a whole to separate the rollers from the driving belt and may be pneumatically operated, the control member controlling the flow of compressed air to the mechanism.

4 Claims, 2 Drawing Figures

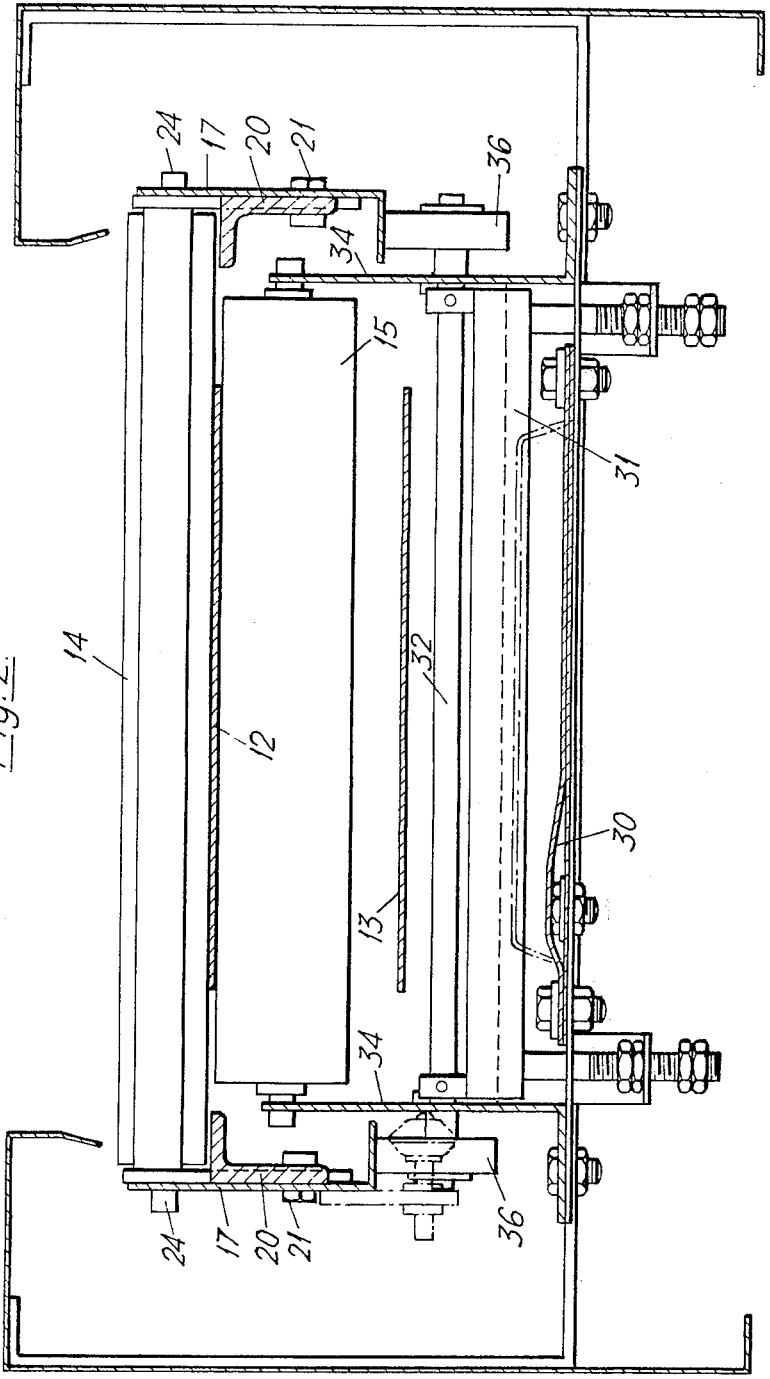

LIVE ROLLER CONVEYOR

This invention relates to so-called "live" roller conveyors of the kind in which the conveying rollers are free to turn between side members and are driven by means of an endless driving belt or the like which engages the underside of the rollers. It is particularly concerned with the inclusion of mechanism for separating the driving belt from the rollers in the event of a stoppage so as to avoid overloading of the drive and undue wear and tear to the conveyor which would otherwise result.

U.S Pat. Application No. 310,897 and now U.S. Pat. No. 3,814,233 describes a construction in which this result is achieved by forming at least one group of rollers together with the supporting side members as a unit mounted for movement in a generally horizontal plane in a direction opposite to the direction of conveying against a resilient biassing force. Movement in this direction resulting from the reaction between the driving belt and the conveying rollers in the event of a stoppage serves to actuate a control member to operate an independently powered mechanism for separating the rollers of the unit from the driving belt or the like. In the preferred construction the independently powered mechanism is pneumatically operated and lifts the unit as a whole to separate the conveyor rollers from the driving belt. As particularly described, compressed air is supplied to the mechanism under the control of a stop member which then retains the unit or each unit in the raised position until the stop member is moved to its inoperative position which has the effect of cutting off the compressed air and thus of lowering the various units. If, for example, a relatively large number of units are involved and there has been a large accumulation of articles this whole accumulation will move forwards together as soon as the various units are lowered again to the driving position. If in the meanwhile individual articles have been removed from the accumulation to leave gaps these gaps will persist in the accumulation as it is fed forwards.

In many cases this is quite acceptable, but in some circumstances it is preferable that any gaps formed in this way should automatically close up so that when conveying is resumed there will be either a continuous stream of articles or alternatively a series of complete batches with only relatively small gaps between them. The present invention is concerned with a modification of the apparatus just described whereby this result can be achieved.

According to the present invention, the apparatus of the earlier application is modified by the provision of a braking pad to engage the first few rollers in the unit when the rollers of the unit are separated from the driving belt or the like by the independently powered mechanism and the control member operates in such a way as to operate the mechanism when it is actuated and to release the mechanism when it is released. As in the earlier application, the independently powered mechanism preferably operates to lift the unit as a whole including the braking pad and thus to bring the pad into engagement with the undersides of the first few rollers in the unit before they also are lifted.

Initially operation occurs in exactly the same manner as described in the earlier application. In other words, in the event of a stoppage, the reaction of the driving belt with the rollers causes the unit to move rearwardly to actuate the control member so as to cause the unit to be lifted by the independently powered mechanism. The lifting action brings the braking pad into engagement with the first few rollers of the unit so that these rollers are effectively trapped between the braking pad and the article or articles on the leading part of the unit. These rollers are therefore prevented from rotation and the unit is thus held in its rearward position against the effect of the resilient bias, thus holding the control member in its actuated position and keeping the independently powered mechanism operated so that the unit remains in the lifted position.

If, under these conditions, the first article on the unit is removed (i.e. the article responsible for the stoppage) there is nothing to stop the forward movement of the next adjacent article and nothing to prevent the forward movement of the unit as a whole under the effect of the resilient bias. This releases the control member, thus releasing the independently powered mechanism and lowering the unit as a whole into contact with the driving belt, thereby resuming the drive and advancing the articles on the unit until they are once again arrested either by a stop member or by the articles on the preceding unit of the conveyor. As soon as this occurs, there is the same sequence of events as previously described, i.e. the reaction moves the unit rearwardly, the control member is actuated and the cycle is repeated to lift the unit once again after having closed up the gap left by the removal of the first article on the unit.

This is in contrast to the operation of the conveyor described in the earlier application. In this previous construction, once the unit has been lifted by the independently powered mechanism, it remains in this lifted position whatever the position of the control member. In other words, even though the unit is capable of moving forwardly under the influence of the resilient bias, so as to release the control member, this still does not release the independently powered mechanism which holds the unit in the raised position until power is subsequently removed from the unit by movement of the stop member to its inoperative position. With a conveyor in accordance with the present invention, however, forward movement of the unit under the effect of the resilient bias causes the unit to be lowered into engagement with the driving belt so that the unit, or each unit when there is a series of units in the conveyor, is able to respond automatically to the removal of an article from the conveying surface so that any gaps which may be formed are automatically closed.

A conveyor in accordance with the present invention will now be described in more detail, by way of example, with reference to the accompanying drawings, in which:

FIG. 1 is an elevation with parts broken away of the leading end of one end of a unit forming part of a conveyor in accordance with the invention; and FIG. 2 is a sectional view to an enlarged scale seen along the line II—II in FIG. 1.

The apparatus is basically the same as in the earlier application and only the main components will therefore be described.

Turning first to FIG. 1, the unit of the conveyor shown is intended to convey articles from right to left, as a consequence of which, the upper run 12 of a driving belt moves from left to right as indicated by the arrow while the return run 13 moves from right to left. As a consequence of the movement of the run 12 of the belt, conveying rollers 14 are driven in an anticlockwise direction so that any articles resting on them are conveyed from right to left as just mentioned. The run 12 of the belt is supported at intervals by rollers 15 and the conveying rollers 14 are mounted to turn in slots 16 in side plate 17. As so far described, the operation is exactly the same as set forth in the earlier application.

The main modification in respect of the earlier apparatus is the provision of braking pads 20 shaped as seen in FIG. 2 which are fixed to the side plate 17 by means of bolts 21. As seen in FIG. 1, the braking pads 20 extend over the first six conveying rollers 14 at the leading end of the unit. In the normal operating position as seen in FIG. 2, the rollers 14 are supported by the run 12 of the driving belt and by the rollers 15 so that they are just clear of the braking pads 20. In this position, the spindles 24 of these rollers are just clear of the bottoms of the respective slots 16 so that the rollers are supported by the belt 12 rather than by the side plate 17. The remainder of the rollers 14 have no braking device. Six of such rollers are shown in FIG. 1, but this Figure shows only one half of the complete unit and the remaining twelve rollers in the right-hand half of the unit similarly have no braking pad.

The unit as a whole, i.e. comprising primarily the side members 17 and the conveying rollers 14 is fitted with a pair of lifting devices comprising inflatable members 30 seen in section in FIG. 2. One of these members is illustrated in the inflated condition in FIG. 1, being located beneath the centre of gravity of the braking pads 20 and a second similar device is fitted at a corresponding position towards the right-hand end of the unit. When inflated, each device 30 engages a cross-member 31 connected to a spindle 32 which extends through slots formed in supports 34 for one of the belt rollers 15. The spindle 32 carries at its ends rollers 36 which engage beneath flanges 38 projecting from the side members 17 and permit free horizontal movement of the unit. Consequently, inflation of the lifting devices 30 lifts the rollers 36 and hence the side plates 17. Owing to the fact that the spindles 24 of the conveying rollers 14 are not resting on the bottoms of their slots 16, as already described there is a small degree of lost motion between the side members 17 and the spindles 24 as the side members are lifted, with the result that the braking pads 20 come into engagement with the undersides of the rollers 14 and then lift them clear of the run 12 of the driving belt. The remainder of the conveying rollers 14 to the right of the braking pads 20 are lifted by engagement of the spindles 24 with the bottoms of the slots 16 and these rollers remain free to turn.

When a stoppage occurs, the movement of the run 12 of the driving belt from left to right causes a reaction in this direction on the unit as a whole in the same way as described in the earlier application and this causes movement of the unit to the right against the tension of a spring 40 anchored at 41 to the fixed frame of the conveyor and at 42 to an adjusting screw 43 passing through a bracket 44 extending downwardly from the movable unit. In the position shown in FIG. 1, the bracket 44 is pulled up against an adjustable stop 45 by means of the spring 40, but in the event of a stoppage, the reaction caused by the driving belt moves the bracket 44 away from the stop 45 and into contact with a plunger 46 of a switch 47 controlling a pneumatic supply to the lifting devices 30. The pneumatic circuit itself is not illustrated, but is considerably simplified in respect of the circuit shown in the earlier application. In the modified apparatus of the present invention, air supply lines extend in parallel to all the lifting devices 30 and are controlled independently by the switches 47 of the different units. When the switch 47 is operated, the respective lifting devices 30 are inflated to lift the unit and when the switch 47 is released again, the pneumatic pressure to the lifting devices 30 is similarly released and the unit is lowered again.

The effect of this mode of operation will now be described in terms of an accumulation of articles arrested by a mechanical stop member 50 which, unlike the stop member of the earlier application, has no controlling effect at all on the pneumatic circuit. The stop member 50 is illustrated as having arrested a row of articles, the first few of which are shown in dotted lines as A, B and C. As previously described, the weight of these articles prevents the rotation of the conveying rollers 14 by which they are supported, leading to a reaction from the driving belt which operates the switch 47, inflates the lifting devices 30 and consequently lifts the unit as a whole. As previously described, the conveying rollers 14 in engagement with the braking pad 20 are then trapped between the pad and the undersurfaces of the articles and are thus prevented from rotating. As a consequence, the tension in the spring 40, is transmitted from the unit to the row of articles and thence to the stop member 50 which thus resists the tension in the spring and prevents the unit being moved back to the left which would release the switch 47 and thus lower the unit. The unit thus remains in the raised position and the conveying rollers 14 which are not engaged by the braking pad 20 are clear of the upper run 12 of the driving belt and are thus free to turn so that further articles can be pushed over these rollers by the drive from the next unit to the right, these articles accumulating behind the row illustrated. When the accumulation of articles stretches back to the next unit to the right, the same operation will occur and the unit will be raised so as to remove the drive from the conveying rollers, the unit then remaining in the raised position. If, under these conditions, the stop member 50 is removed, there is no longer anything to prevent the movement of the unit to the left under the tension in the spring 40. This then releases the switch 47, allowing the lifting members 30 to be exhausted and thereby lowering the unit to resume drive. As soon as the articles start to move towards the left on this unit, the next unit to the right is released in a similar way and drive resumed.

A similar result will also occur if, for example, the article A is removed. This again allows the unit to move to the left under the tension in the spring 40, the unit is lowered to resume the drive and this continues until the article B is arrested by the stop member 50 when the same cycle of operation occurs. If the article B is removed, the resistance offered by the rollers 14 trapped between the article A and the braking pad 20 is not sufficient to withstand the tension in the spring 40. The unit is consequently moved to the left to resume the drive and the article C and subsequent articles are then forwarded until stopped by the presence of the article A.

If the article C or other article which is supported by the freely rotatable rollers 14 to the right of the braking pad 20 is removed, it is the unit to the right which is released, this unit being lowered to resume the drive until the gap is closed and then subsequently raised again to remove the drive.

I claim:

1. In a roller conveyor comprising side members, a plurality of rollers mounted to rotate freely between said side members and a support carrying endless driving means which engages the undersides of said rollers, the improvement comprising means mounting at least one group of rollers and their supporting side members for movement as a unit in a generally horizontal plane in a direction opposite to the direction of conveying, resilient biasing means opposing said movement, a control member actuated by movement of said unit against said biasing means in excess of a predetermined amount, an independently powered mechanism actuated by said control member for separating the rollers of said unit from said endless driving means, and released by said control member when said control member is released by reverse movement of said unit, and braking means for engaging a few rollers at the leading end of said unit when said rollers are separated from said endless driving means.

2. A roller conveyor according to claim 1, in which said independently powered mechanism operates to lift said unit as a whole including said braking means whereby to bring said braking means into engagement with the undersides of said few rollers in said unit before said rollers also are lifted.

3. A roller conveyor according to claim 2, in which said independently powered mechanism includes a plurality of rollers whereby to assist free horizontal movement of said unit.

4. A roller conveyor according to claim 2, in which said independently powered mechanism includes a pair of inflatable members of generally tubular configuration, one of said inflatable members being located substantially below the centre of gravity of said braking means.

* * * * *